(12) United States Patent
Myokan et al.

(10) Patent No.: US 12,360,600 B2
(45) Date of Patent: Jul. 15, 2025

(54) CONTROL DEVICE AND PROGRAM

(71) Applicant: KABUSHIKI KAISHA TOKAI RIKA DENKI SEISAKUSHO, Aichi (JP)

(72) Inventors: Mayu Myokan, Aichi (JP); Takeshi Ohnishi, Aichi (JP); Masahiro Wasai, Aichi (JP); Keita Nakane, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 18/273,873

(22) PCT Filed: Dec. 21, 2021

(86) PCT No.: PCT/JP2021/047159
§ 371 (c)(1),
(2) Date: Jul. 24, 2023

(87) PCT Pub. No.: WO2022/163215
PCT Pub. Date: Aug. 4, 2022

(65) Prior Publication Data
US 2024/0160289 A1    May 16, 2024

(30) Foreign Application Priority Data
Jan. 28, 2021   (JP) .................................. 2021-011818

(51) Int. Cl.
*G06F 3/01* (2006.01)
*G06F 3/16* (2006.01)

(52) U.S. Cl.
CPC .............. *G06F 3/016* (2013.01); *G06F 3/165* (2013.01)

(58) Field of Classification Search
CPC ........ G06F 3/03545; G06F 3/016; G06F 3/16; G06F 3/167; G06F 3/165; A63F 13/285
See application file for complete search history.

(56) References Cited

U.S. PATENT DOCUMENTS

| | | | |
|---|---|---|---|
| 2010/0090815 A1 | 4/2010 | Yamaya | |
| 2017/0136354 A1* | 5/2017 | Yamano | ................ G06F 1/1632 |
| 2019/0311590 A1* | 10/2019 | Doy | ........................ H03F 3/183 |

(Continued)

FOREIGN PATENT DOCUMENTS

| | | |
|---|---|---|
| WO | 2008/078523 A1 | 7/2008 |
| WO | 2019/234191 A1 | 12/2019 |

OTHER PUBLICATIONS

International Search Report issued in WIPO Patent Application No. PCT/JP2021/047159, dated Mar. 22, 2022, along with an English translation thereof.

(Continued)

*Primary Examiner* — Xuemei Zheng
(74) *Attorney, Agent, or Firm* — GREENBLUM & BERNSTEIN, P.L.C.

(57) ABSTRACT

To provide a control device and a program capable of presenting vibration for improving a feeling of presence. A control device includes a control unit that performs processing of outputting a vibration control signal for controlling generation of vibration to a vibration generation unit, the vibration control signal being generated by combining a vibration waveform for compensating vibration by a sound signal with the sound signal.

13 Claims, 11 Drawing Sheets

(56) References Cited

U.S. PATENT DOCUMENTS

2020/0061460 A1* 2/2020 Nakagawa ............ A63F 13/215
2022/0293126 A1* 9/2022 Ogita ...................... H04R 1/00
2024/0069640 A1* 2/2024 Long .................. G06F 3/04815

OTHER PUBLICATIONS

Written Opinion issued in WIPO Patent Application No. PCT/JP2021/047159, dated Mar. 22, 2022.

* cited by examiner

FIG. 4
SOUND SIGNAL OF SOUND SOURCE AS BASIS
FFT
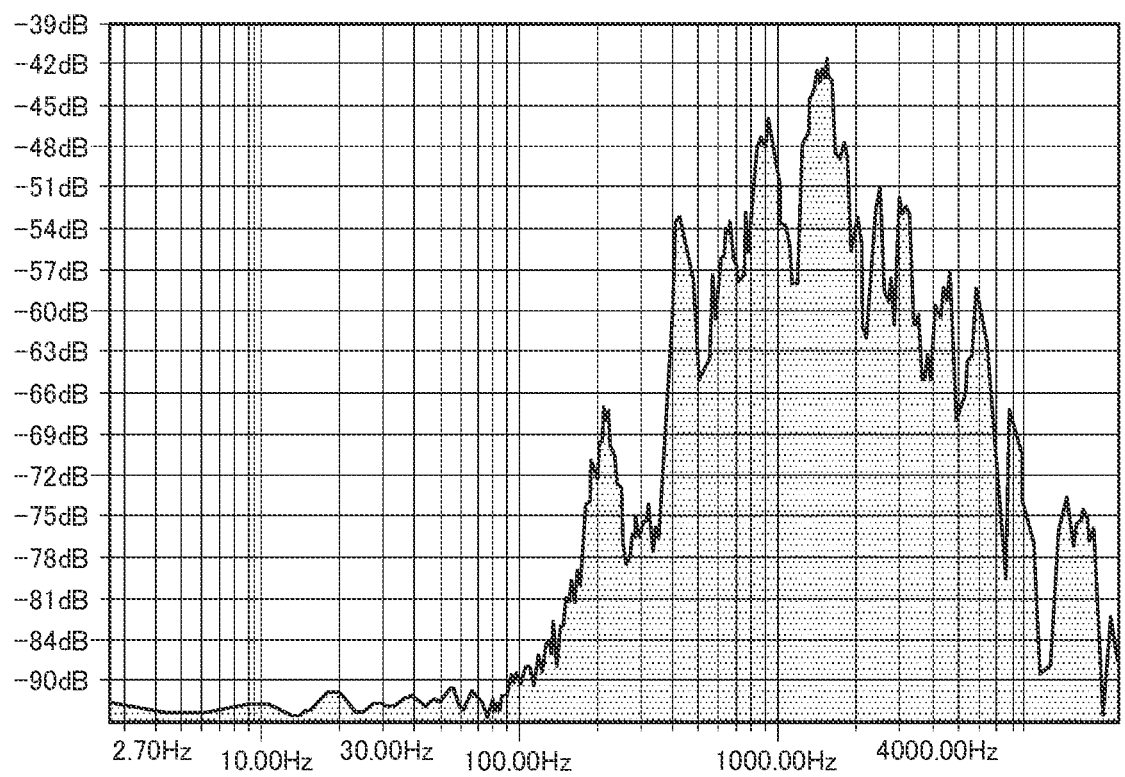

FIG. 5
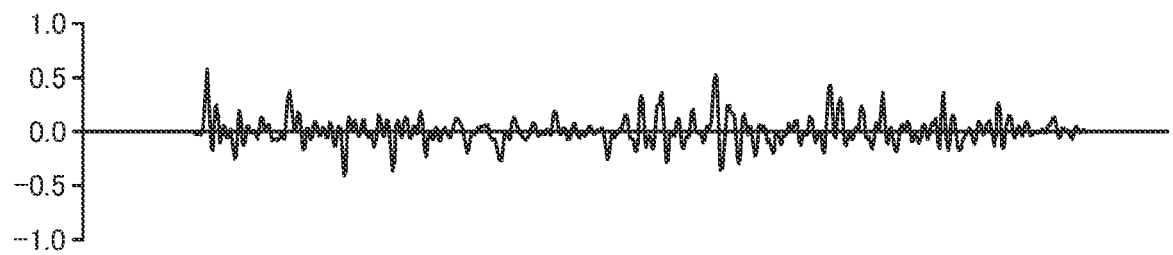
VIBRATION WAVEFORM
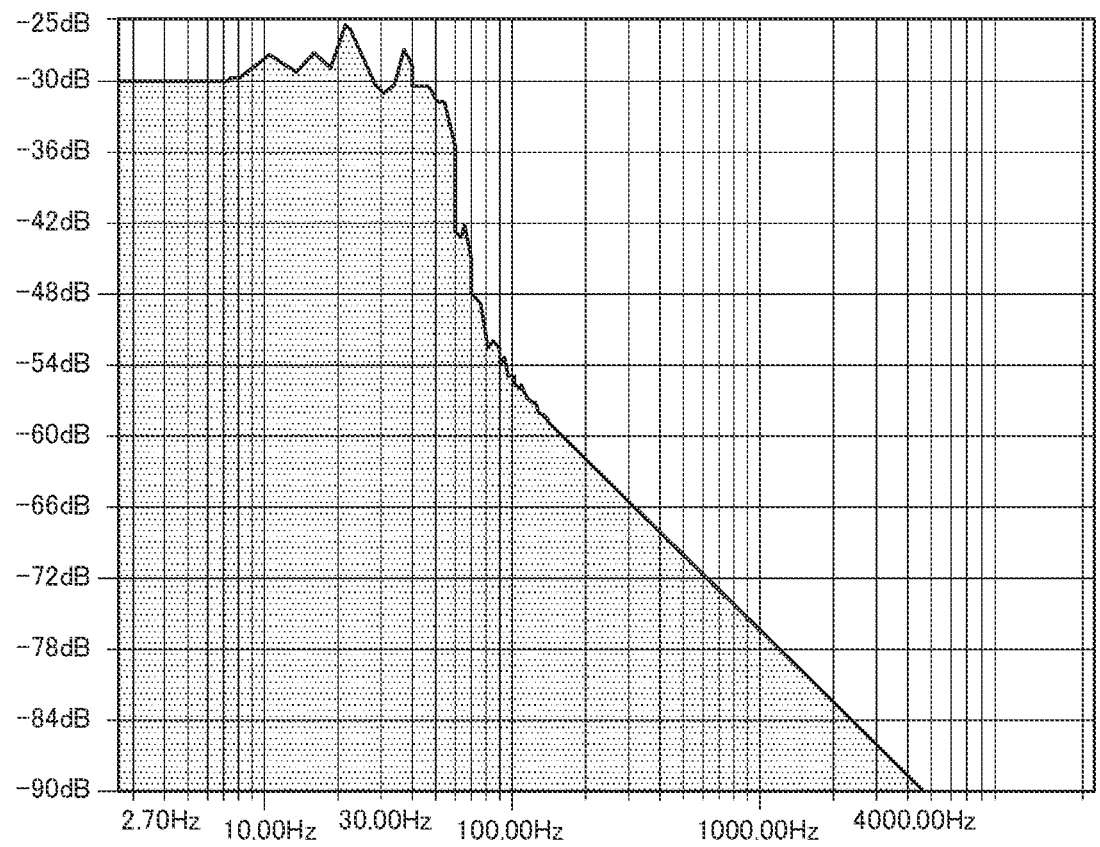
FFT

FIG. 6
VIBRATION CONTROL SIGNAL
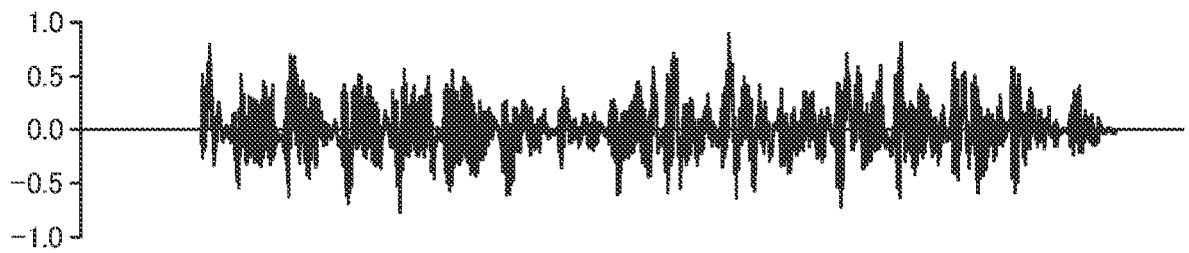
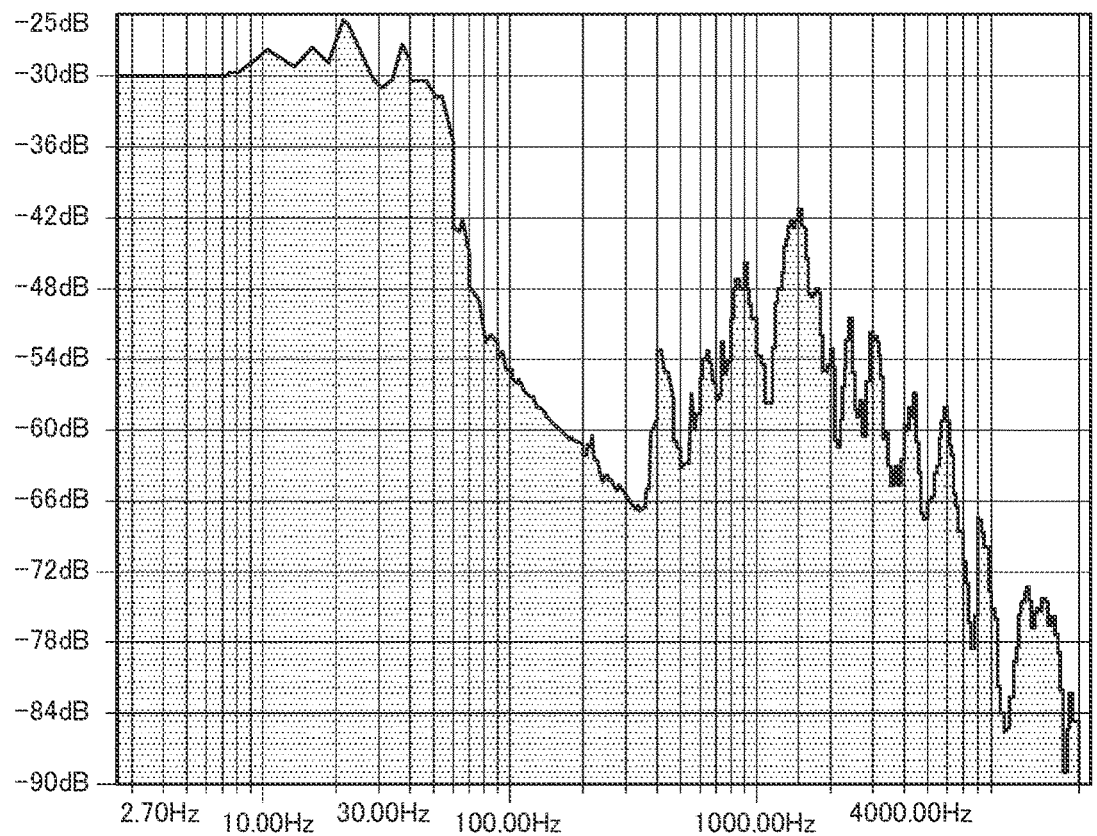

FIG. 7
SOUND SIGNAL OF SOUND SOURCE AS BASIS
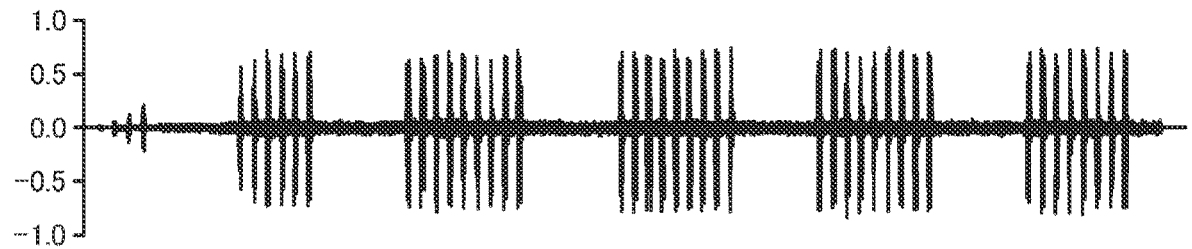
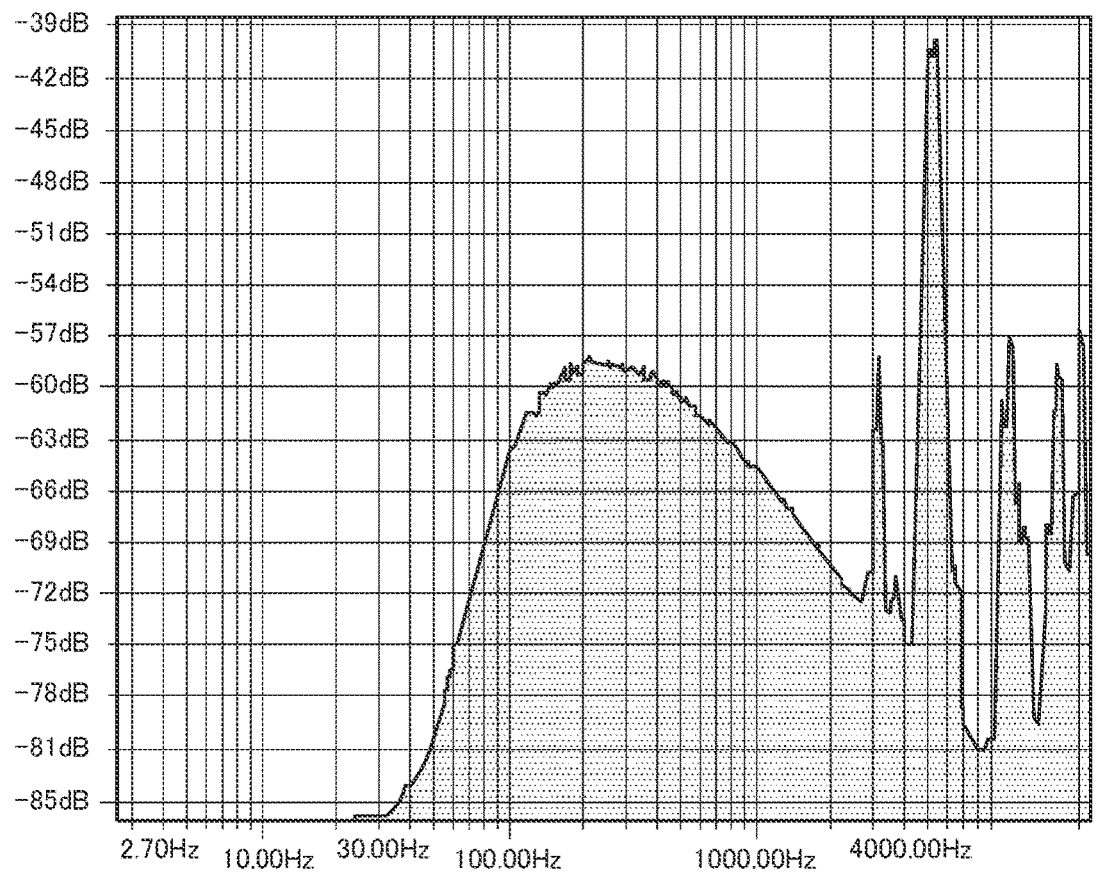

CONTROL DEVICE AND PROGRAM

TECHNICAL FIELD

The present invention relates to a control device and a program.

BACKGROUND ART

In recent years, there has been a technology of providing feedback by sound or vibration when an input is performed using a finger, a stylus, or the like onto a touch panel display or the like having an input detection function and a display function, so as to give a real feeling of the input to a user. For example, the following Patent Literature 1 discloses that the vibration corresponding to writing is presented to a user in an electronic input system in which handwriting input is electronically performed. Further, the following Patent Literature 1 also discloses that a part of the signal for generating the vibration corresponding to writing is used for sound signal output so that the vibration and sound are generated at the same time.

CITATION LIST

Patent Literature

Patent Literature 1: WO 2008/078523 (A1)

SUMMARY OF INVENTION

Technical Problem

Here, sound reaches human ears by air vibration, and the audible frequency band is approximately 20 Hz to 20 kHz. Further, sound of approximately 100 Hz or lower (low frequency) can also be perceived as vibration. That is, persons may not only hear sound generated from sound sources with their ears but also perceive the vibration of sound with their bodies. However, the conventional sound presentation system does not consider even the reproduction of vibration that can be generated from actual sound sources, and thus is poor in feeling of presence. Further, in the technology of the above-described Patent Literature 1, it is described that the vibration and sound are generated at the same time. However, only a part of vibration waveform data generated by the combination of a writing instrument and a selected writing object is output as a sound signal.

Therefore, in view of the above-described problems, the present invention aims at providing a new and improved control device and program capable of presenting vibration for improving a feeling of presence.

Solution to Problem

To solve the above-described problems, according to an aspect of the present invention, there is provided a control device, comprising a control unit that performs processing of combining a vibration waveform for compensating vibration by a sound signal with the sound signal so as to generate a vibration control signal for controlling generation of vibration.

To solve the above-described problems, according to other aspect of the present invention, there is provided a control device, comprising a control unit that performs processing of combining a vibration waveform for compensating vibration by a sound signal with the sound signal so as to generate a vibration control signal for controlling generation of vibration, and processing of outputting the generated vibration control signal to a vibration generation unit.

To solve the above-described problems, according to other aspect of the present invention, there is provided a control device, comprising a control unit that performs processing of outputting a vibration control signal for controlling generation of vibration to a vibration generation unit, the vibration control signal being generated by combining a vibration waveform for compensating vibration by a sound signal with the sound signal.

To solve the above-described problems, according to other aspect of the present invention, there is provided a program, causing a computer to function as a control unit that performs processing of combining a vibration waveform for compensating vibration by a sound signal with the sound signal so as to generate a vibration control signal for controlling generation of vibration.

To solve the above-described problems, according to other aspect of the present invention, there is provided a program, causing a computer to function as a control unit that performs processing of outputting a vibration control signal for controlling generation of vibration to a vibration generation unit, the vibration control signal being generated by combining a vibration waveform for compensating vibration by a sound signal with the sound signal.

Advantageous Effects of Invention

As is described above, in the present invention, it is possible to present vibration that improves realistic sensations.

BRIEF DESCRIPTION OF DRAWINGS

FIG. 4 is a diagram illustrating an example of a sound signal of a sound source as a basis according to the embodiment.

FIG. 5 is a diagram illustrating an example of a vibration waveform generated by amplification processing according to the embodiment.

FIG. 6 is a diagram illustrating an example of a vibration control signal generated by combining a vibration waveform with a sound signal of a sound source as a basis according to the embodiment.

FIG. 7 is a diagram illustrating an example of a sound signal of a sound source as a basis according to the embodiment.

DESCRIPTION OF EMBODIMENTS

Figure 1:
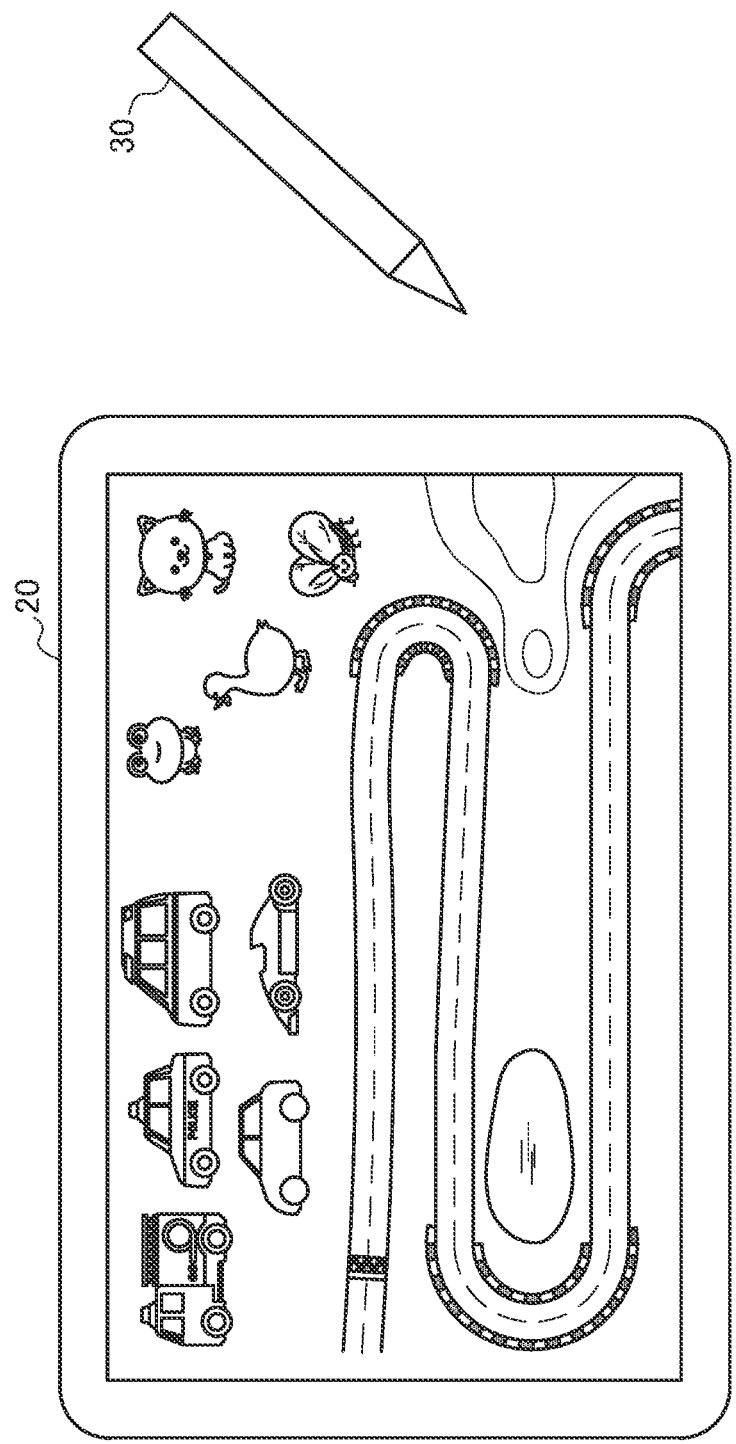
FIG. 1 is a diagram for explaining an output device that presents sound and vibration according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

1. Overview

A control device according to an embodiment of the present invention achieves presentation of vibration for improving a feeling of presence using a vibration control signal generated on the basis of a sound signal. To be more specific, the control device of the embodiment performs a control of outputting sound and vibration corresponding to the sound, thereby further improving a feeling of presence in sound presentation. The feeling of presence can be considered as a feeling of reality in a simulated experience. Further, the vibration control signal is information for controlling generation of vibration. Examples of the vibration control signal include vibration waveform data showing a vibration waveform.

An example of the control device performing sound presentation and vibration output control of the embodiment is an output device 20 illustrated in FIG. 1. FIG. 1 is a diagram for explaining the output device 20 that presents sound and vibration according to an embodiment of the present invention. A display unit of the output device 20 (an example of the control device) illustrated in FIG. 1 displays, for example, images of vehicles and images of animals that can be selected by a user. The user selects an arbitrary image of a vehicle or animal using, for example, a pen-shaped input device 30 illustrated in FIG. 1. The input device 30 may be an electronic pen wiredly or wirelessly communication-connected with the output device 20, or a pen-shaped pointing device not having an electronic configuration (for example, a stylus supporting an electrostatic induction method).

Having detected that the user selects an arbitrary image of a vehicle or animal and traces, with the input device 30, an image of a road displayed on a display unit of the output device 20, the output device 20 performs a control of outputting sound corresponding to the selected image of a vehicle or animal (vehicle sound, creature cries, or the like) and outputting the vibration corresponding to the sound. The vibration control signal used for such vibration output can be preliminarily generated by a generation device (an example of the control device) and stored in the output device 20.

The generation device of the embodiment performs predetermined processing of improving a feeling of presence on a sound signal so as to generate a vibration control signal. It is possible to generate vibration by inputting a sound signal to a vibration generation unit. However, the sound signal (recorded sound data or the like) of vehicle sound or creature cries as it is has small low frequency components, for example, and thus the vibration may not be sufficiently generated, thus resulting in poor feeling of presence. Therefore, the generation device of the embodiment may perform, for example, processing of amplifying low frequency components of the sound signal so as to generate the corresponding vibration waveform data. Further, in a case where the sound mainly has only high frequencies and is difficult to perceive as vibration, the generation device may perform processing of combining low frequencies at the timing of the sound so as to generate vibration waveform data exhibiting the movement of a sound source. The vibration control signal generated by the generation device is associated with the sound signal and stored in the output device 20.

Further, the vibration generation unit generating vibration may be provided in the output device 20 or in the input device 30. For example, in a case where the vibration generation unit is provided in the output device 20, the vibration generated by the vibration generation unit reaches the user directly to his/her hand in contact with the output device 20 or through the input device 30.

In this manner, the sound of a vehicle or creature selected by the user is reproduced, and the vibration generated by performing predetermined processing of improving a feeling of presence is output and transmitted to user's body, thus allowing the user to feel the movement of the vehicle or creature (providing a touch feeling) and providing a more realistic simulated experience as if the vehicle or creature actually existed there. In this manner, it is possible to provide not only visual and auditory information but also tactile information. Such a technology can be applied, for example, to picture books, illustrated reference books, learning materials, and the like for children.

Note that the use form of sound and vibration illustrated in FIG. 1 is an example, and the embodiment is not limited thereto. Further, the output device 20 is not limited to the tablet terminal illustrated in FIG. 1, and may be a smartphone, a mobile phone terminal, a personal computer (PC), a wearable device (head-mounted type, glasses type, watch type, wristband type, necklace type, earring type, and the like), various dedicated terminals, or the like.

2. Configuration Example

The following will sequentially describe functional configuration examples of a generation device 10 and the output device 20 according to the embodiment.

2-1. Generation Device 10

Figure 2:
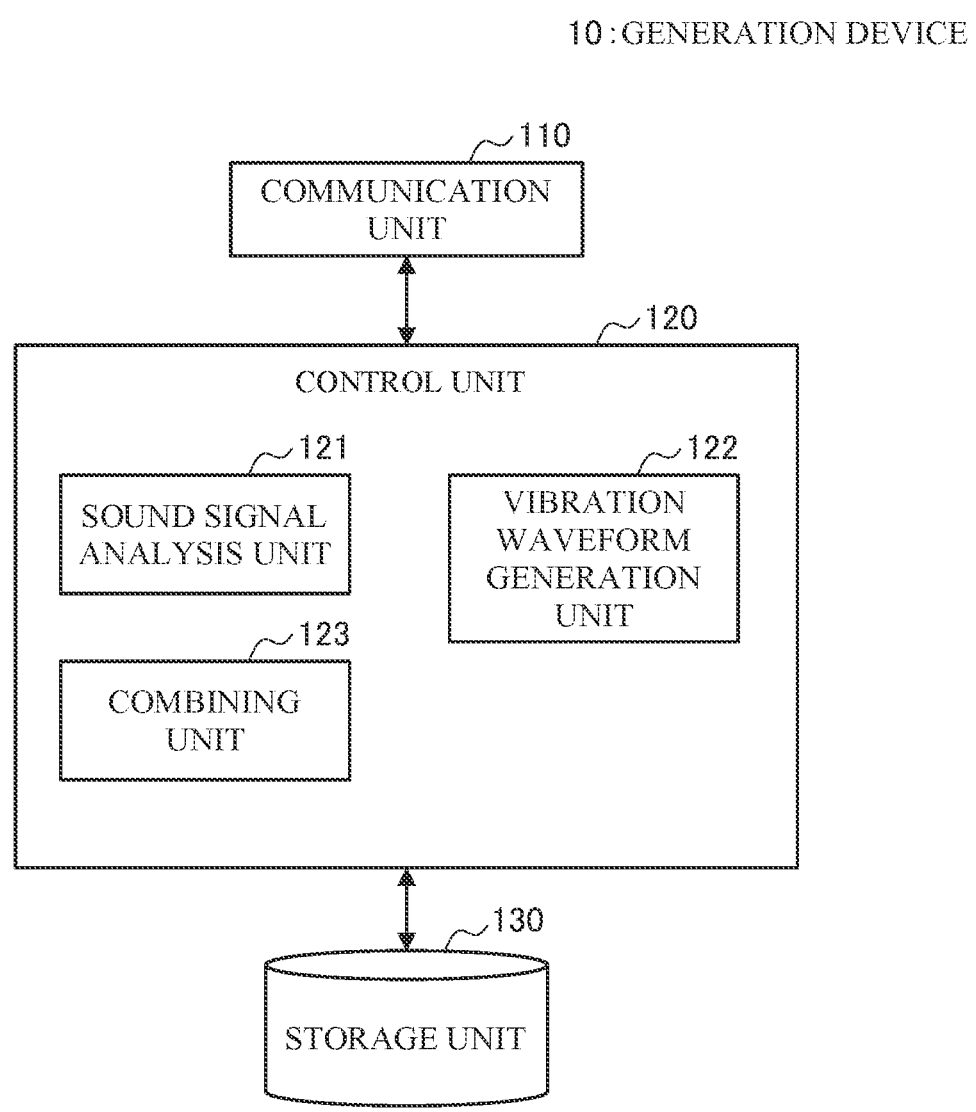
FIG. 2 is a block diagram illustrating a configuration example of a generation device according to the embodiment.

FIG. 2 is a block diagram illustrating a configuration example of the generation device 10 according to the embodiment. As illustrated in FIG. 2, the generation device 10 includes a communication unit 110, a control unit 120, and a storage unit 130.

(Communication Unit 110)

The communication unit 110 has a function of transmitting and receiving data to and from an external device. For example, the communication unit 110 associates a generated vibration control signal with the sound control signal as a basis, and transmits it to the output device 20 wiredly or wirelessly. For example, the communication unit 110 may perform communication connection wiredly or by wireless local area network (LAN), Wi-Fi (registered trademark), Bluetooth (registered trademark), or the like.

(Control Unit 120)

The control unit 120 functions as an arithmetic processing device or a control device, and controls the operation of each structural element entirely or partially on the basis of various programs recorded on a read only memory (ROM), a random access memory (RAM), the storage unit 130, or the like. The control unit 120 may be realized by, for example, a processor such as a central processing unit (CPU) or a micro controller unit (MCU).

Further, the control unit 120 of the embodiment also functions as a sound signal analysis unit 121, a vibration waveform generation unit 122, and a combining unit 123. The sound signal analysis unit 121 analyzes a sound signal. For example, the sound signal analysis unit 121 performs analysis (fast Fourier transform: FFT) of the frequency characteristics of a sound signal. The vibration waveform generation unit 122 generates vibration waveform data (an example of vibration information) for compensating vibration by a sound signal on the basis of an analysis result by the sound signal analysis unit 121. Further, the combining unit 123 combines vibration waveform data generated by the vibration waveform generation unit 122 with the sound signal as a basis so as to generate a vibration control signal. The vibration control signal is data input to a vibration generation unit 260 (vibration actuator) in the output device 20 described later. The vibration control signal is a signal indicating a waveform (analog signal waveform) for vibrating the vibration generation unit 260 (vibration actuator) described later. The vibration control signal may be a signal of a vibration waveform itself (vibration signal), a digitized vibration waveform, or a set of a value indicating the frequency of a vibration waveform and a value indicating the amplitude thereof. In a case where the vibration generation unit 260 is realized by a voice coil type actuator that converts a sound signal obtained by electrically converting sound, into mechanical vibration, that is, the voice coil type actuator that generates, corresponding to a sound signal, vibration substantially along the waveform of the sound signal, a signal indicating a waveform (vibration waveform) of an analog signal (vibration signal) such as a sound signal is used as a vibration control signal. A concrete example of vibration control signal generation according to the embodiment will be described later.

(Storage Unit 130)

The storage unit 130 has a function of storing various kinds of information for the operation of the generation device 10. For example, the storage unit 130 stores programs and the like for the operation of the generation device 10. The storage unit 130 is formed by, for example, a storage medium such as a flash memory and a processing device that performs recording and reproduction on a storage medium.

Further, the storage unit 130 stores a sound signal to be processed. Further, the storage unit 130 stores a generated vibration control signal and a sound signal as a basis in an associated manner.

The configuration of the generation device 10 has been described above. However, this configuration is an example, and the embodiment is not limited thereto. For example, the generation device 10 may be formed by a plurality of devices. Moreover, the generation device 10 may further include a display unit and an operation input unit. For example, an administrator may specify or input a target sound signal to be analyzed by the sound signal analysis unit 121.

2-2. Output Device 20

Figure 3:
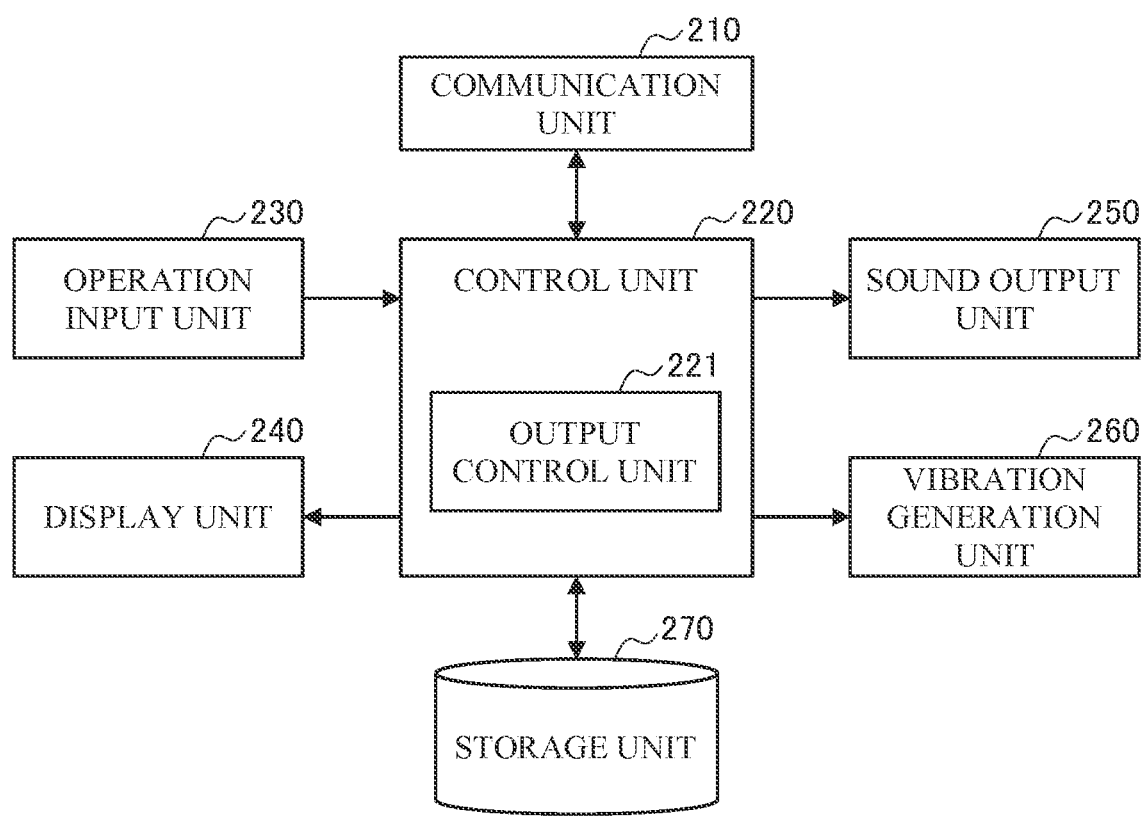
FIG. 3 is a block diagram illustrating a configuration example of the output device according to the embodiment.

FIG. 3 is a block diagram illustrating a configuration example of the output device 20 according to the embodiment. As illustrated in FIG. 3, the output device 20 includes a communication unit 210, a control unit 220, an operation input unit 230, a display unit 240, a sound output unit 250, the vibration generation unit 260, and a storage unit 270.

(Communication Unit 210)

The communication unit 210 has a function of transmitting and receiving data to and from an external device. For example, the communication unit 210 receives a sound signal and the corresponding vibration control signal wiredly or wirelessly. For example, the communication unit 210 may perform communication connection wiredly or by wireless local area network (LAN), Wi-Fi (registered trademark), Bluetooth (registered trademark), or the like.

(Control Unit 220)

The control unit 220 functions as an arithmetic processing device or a control device, and controls the operation of each structural element entirely or partially on the basis of various programs recorded on a read only memory (ROM), a random access memory (RAM), the storage unit 270, or the like. The control unit 220 may be realized by a processor such as a central processing unit (CPU) or a micro controller unit (MCU).

Further, the control unit 220 of the embodiment also functions as an output control unit 221. The output control unit 221 performs a control of outputting a sound signal from the sound output unit 250 and inputting a vibration control signal corresponding to the sound signal to the vibration generation unit 260 so as to generate vibration. The output control unit 221 performs a control of outputting a predetermined sound signal and vibration control signal in response to a predetermined trigger such as an operation by a user or the state of the output device 20.

(Operation Input Unit 230 and Display Unit 240)

The operation input unit 230 receives user's operation input to the output device 20, and outputs the operation input information to the control unit 220. The operation input unit 230 may be realized by a touch pad, a mouse, a keyboard, a controller, a camera, a microphone, various sensors, or the like. The display unit 240 has a function of displaying various images. The display unit 240 may be realized by, for example, a touch panel display that is a device integrated with the operation input unit 230.

(Sound Output Unit 250)

The sound output unit 250 has a function of outputting sound.

(Vibration Generation Unit 260)

The vibration generation unit 260 is a vibration actuator that generates vibration, that is, the vibration actuator that presents a tactile stimulus. The vibration generation unit 260 is realized by, for example, a voice coil type actuator that converts a sound signal obtained by electrically converting sound, into mechanical vibration, that is, the voice coil type actuator that generates, corresponding to a sound signal, vibration substantially along the waveform of the sound signal.

(Storage Unit 270)

The storage unit 270 has a function of storing various kinds of information for the operation of the output device 20. For example, the storage unit 270 stores programs and the like for the operation of the output device 20. The storage unit 270 is formed by, for example, a storage medium such as a flash memory and a processing device that performs recording and reproduction on a storage medium. Moreover, the storage unit 270 stores a sound signal and a vibration control signal in an associated manner.

The above has described the configuration example of the output device 20 of the embodiment. Note that the configuration illustrated in FIG. 3 is an example, and the embodiment is not limited thereto. For example, the output device 20 may be formed by a plurality of devices. For example, the vibration generation unit 260 may be provided in a different device.

3. Regarding Generation of Vibration Control Signal

The following will describe generation of a vibration control signal according to the embodiment. In the embodiment, low frequencies are combined with a sound signal of a sound source as a basis so as to compensate vibration by sound. In the following, the explanation will be given using a concrete example.

3-1. First Generation Example

As a vibration control signal first generation example, processing of amplifying low frequency components of a sound signal may be performed. Even if the sound signal prepared for sound output is used as it is for vibration control, it may have small low frequency components, and thus the vibration may not be sufficiently presented or a touch feeling may be poor. Therefore, in the embodiment, the low frequency components are amplified so as to provide firm and powerful vibration and compensate a feeling of presence of sound (provide a feeling of vibration of the air by sound generated from a sound source and its transmission to the body). In the following, the explanation will be given using data examples.

FIG. 4 is a diagram illustrating an example of a sound signal of a sound source as a basis according to the embodiment. The sound signal illustrated in FIG. 4 is a duck cry. Further, FIG. 4 illustrates, in the lower part thereof, a result of applying FFT (fast Fourier transform) to such a sound signal. Even if sound with small low frequency components (for example, 100 Hz or lower) as illustrated in FIG. 4 is input as it is to the vibration actuator (vibration generation unit 260), a touch feeling is not preferable (for example, chattering vibration is strong, which causes an uncomfortable feeling). Examples of sound with low frequency components include a duck cry, engine sound or travelling sound of a vehicle, sound of a drum or a contrabass, and the like.

Therefore, in the embodiment, for example, the vibration waveform generation unit 122 performs processing of extracting, using an 80 Hz low-pass filter, for example, frequency components (low frequency components) from the result of applying FFT by the sound signal analysis unit 121, and amplifying the extracted low frequency components. FIG. 5 illustrates an example of the signal (vibration waveform) generated by such amplification processing.

Then, the combining unit 123 combines the generated vibration waveform with the sound signal of the sound source as a basis so as to generate a signal (vibration control signal) for input to the vibration actuator. FIG. 6 illustrates an example of the vibration control signal generated by combining the vibration waveform illustrated in FIG. 5 with the sound signal of the sound source as a basis illustrated in FIG. 4. With combining of the vibration waveform having amplified low-frequency components, it is possible to add firm and powerful vibration and expect the effect of improving a feeling of presence.

Here, the frequency components to be amplified are not limited to 80 Hz or lower. Because the human skin perceives vibration with a frequency of approximately 500 Hz or lower, a frequency component of at least 500 Hz or lower may be targeted. Further, it has been clearly known that four sensory receptors are distributed in the human skin: Merkel cells, Meissner's corpuscles, Ruffini terminals, and Pacinian corpuscles. Among these, with regard to vibration perception, the Pacinian corpuscles, for example, perceive a frequency band of about 100 Hz to 300 Hz. Thus, the vibration waveform generation unit 122 may amplify frequency components of 300 Hz or lower, for example. Further, among the sensory receptors, Meissner's corpuscles perceive a frequency band of about 20 Hz to 100 Hz. Thus, the vibration waveform generation unit 122 may amplify frequency components of 100 Hz or lower, for example. Note that the numerical values used here are all examples or events, and the embodiment is not limited thereto. The vibration waveform generation unit 122 amplifies the frequency components in a range perceivable by persons and generates a vibration waveform. Further, it is more preferable that the vibration waveform generation unit 122 generates a vibration waveform not causing persons to feel uncomfortable.

Further, the following examples may describe how much (how) the target frequency components are amplified. For example, the vibration waveform generation unit 122 may amplify the entire extracted frequency components, or may amplify extracted frequency components so that a characteristic part (waveform) thereof appears more strongly (amplification reflecting the characteristics). Further, the vibration waveform generation unit 122 may amplify the target frequency components in accordance with the upper limit of the amplitude of the sound source as a basis (the highest value of the amplitude of the sound source as a basis) (up to a predetermined error range with respect to the upper limit). Further, the vibration waveform generation unit 122 may amplify the target frequency components to an approximately half of the upper limit of the amplitude of the sound source as a basis (the highest value of the amplitudes of the sound source as a basis).

3-2. Second Generation Example

As the vibration control signal second generation example, in a case where the sound is difficult to perceive as vibration because the sound mainly has only high frequencies, there may be performed processing of combining a low frequency at timing of the sound. In this manner, it is possible to express the movement of the sound source (sound generation source) (present the movement of the sound source by a touch feeling). Examples of sound with substantially only high frequencies include sound of a bell worm, sound of wind-bells, sound of a violin or flute, and the like. Note that the frequency band of high frequencies is not particularly limited, but the embodiment assumes a frequency difficult to perceive as vibration (for example, a frequency of 1 kHz or higher that is difficult to perceive by skin receptors, or the like).

FIG. 7 is a diagram illustrating an example of the sound signal of a sound source as a basis according to the embodiment. The sound signal illustrated in FIG. 7 is sound of a bell worm. The example illustrated in FIG. 7 has almost no low frequency (for example, a frequency of 100 Hz or lower). Thus, even if the sound signal is input as it is to the vibration actuator (vibration generation unit 260), it is difficult to give a touch feeling, and it is difficult to provide a simulated experience by vibration. Therefore, in the embodiment, vibration is output at the timing of sound, for example, so as to give a touch feeling of movement of an object as the source of the sound (for example, a bell worm).

Figure 8:
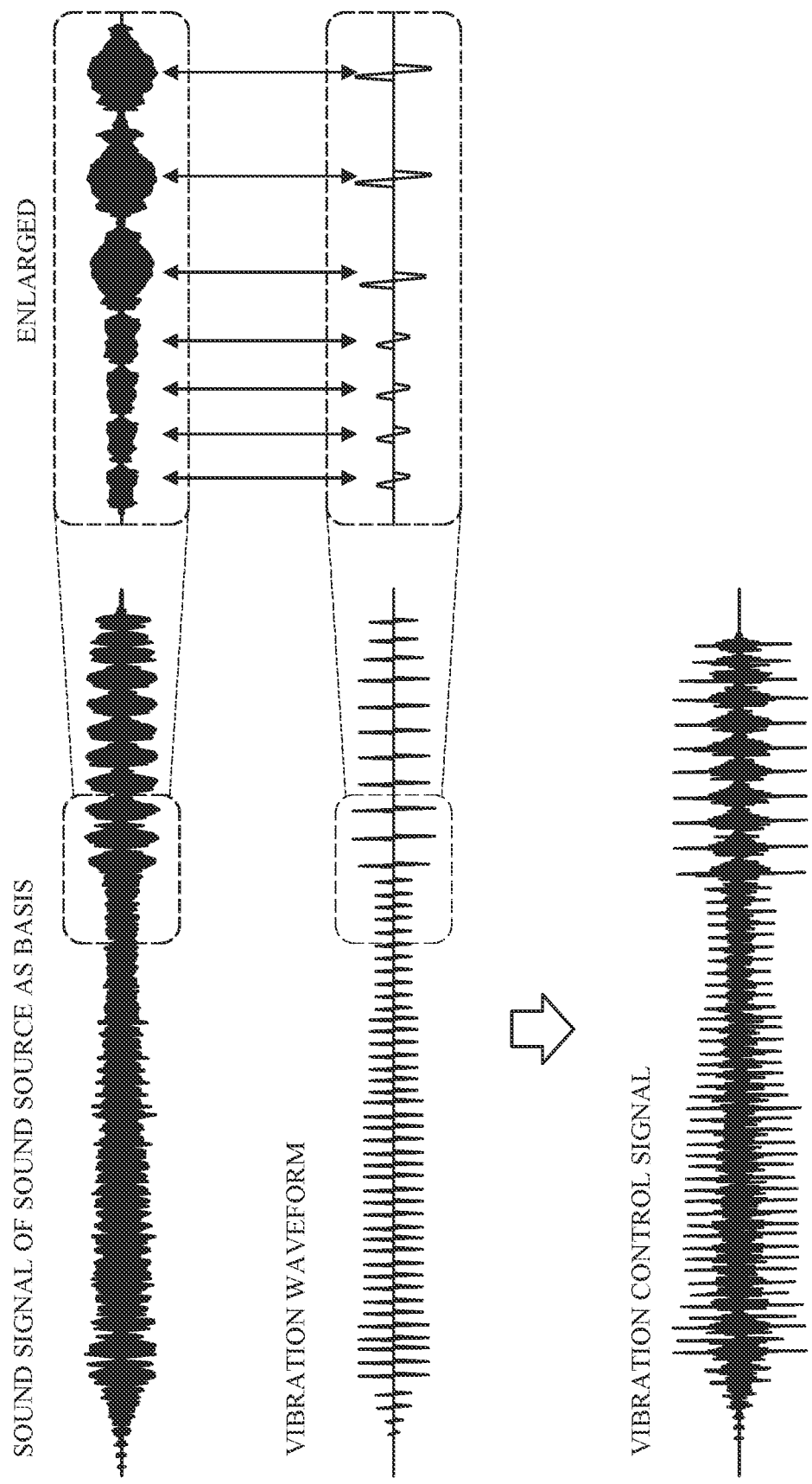
FIG. 8 is a diagram for explaining a vibration control signal generation example according to the embodiment.

FIG. 8 is a diagram for explaining a vibration control signal generation example according to the embodiment. As illustrated in FIG. 8, the generation device 10 generates a vibration waveform for adding a sin wave (sine wave) to a sound pressure equal to or higher than a prescribed threshold in a sound signal of a sound source as a basis, for example, and combines the generated vibration waveform with the sound signal of the sound source as a basis so as to generate a vibration control signal. The sound signal analysis unit 121 can analyze the position of a sound pressure equal to or higher than a prescribed threshold. On the basis of the analysis result, the vibration waveform generation unit 122 generates a vibration waveform for adding a sin wave to a predetermined position. Then, the combining unit 123 combines the generated vibration waveform with the sound signal of the sound source as a basis so as to generate a signal control signal. The vibration generation unit 260 performs an output control of the vibration control signal generated in this manner, whereby it is possible to present, for example, a feeling of an object physically hitting the palm of the hand or a feeling of a moving object. Here, a sin wave is added as an example for explanation. However, the vibration waveform to be added is not limited thereto.

Further, the frequency of the added sin wave may be basically 100 Hz or lower, considering the frequency band perceptible by the Meissner's corpuscle, for example. Alternatively, the frequency of the added sin wave may be 10 Hz to 500 Hz as a target, and is preferable to be basically 200 Hz. In any case, the frequency of the added sin wave is preferably a low frequency perceivable as vibration.

Further, the vibration waveform generation unit 122 may match the amplitude of the vibration waveform with the amplitude of the sound source as a basis. In this manner, it is possible to present the strength and weakness of vibration associated with the strength and weakness of sound.

The generation of a vibration control signal according to the embodiment has been described using the concrete example. Note that the generation of a vibration control signal according to the embodiment is not limited thereto.

4. Operation Processing Example

The following will sequentially describe the vibration control signal generation processing and the vibration control signal output control processing according to the embodiment using a flowchart.

4-1. Generation Processing Example

Figure 9:
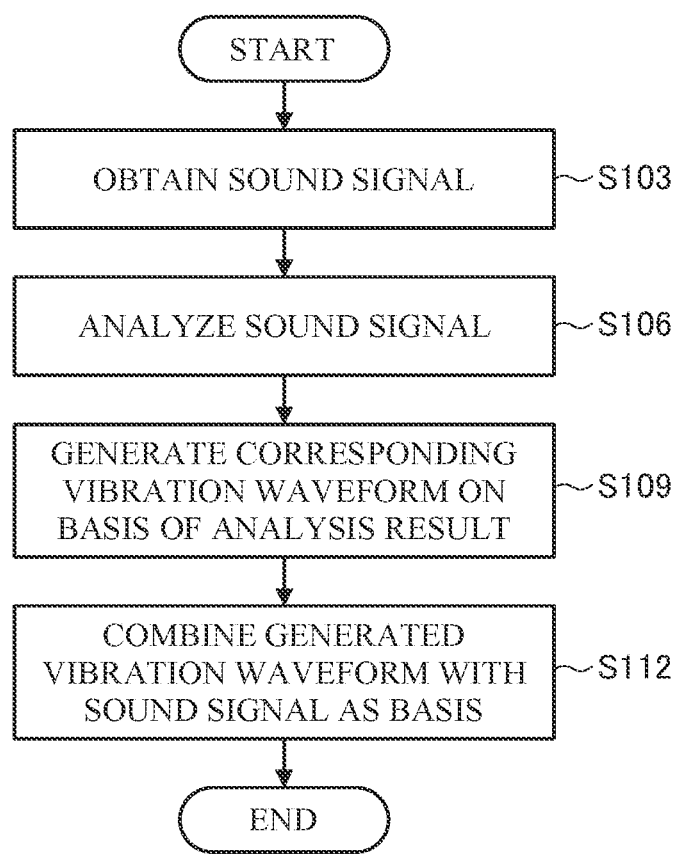
FIG. 9 is a flowchart illustrating an example of a processing flow of a vibration control signal generation control according to the embodiment.

FIG. 9 is a flowchart illustrating an example of a processing flow of a vibration control signal generation control according to the embodiment.

As illustrated in FIG. 9, the sound signal analysis unit 121 first obtains a target sound signal (Step S103). The sound signal may be input from the outside or read out from the storage unit 130. The target sound signal may be specified by an administrator.

Next, the sound signal analysis unit 121 analyzes the sound signal (Step S106).

Next, on the basis of the analysis result, the vibration waveform generation unit 122 generates vibration waveform data for compensating vibration (Step S109).

Then, the combining unit 123 combines the vibration waveform data generated by the vibration waveform generation unit 122 with the sound signal as a basis so as to generate a vibration control signal (Step S112). The generated vibration control signal is associated with the sound signal as a basis and stored.

4-2. Output Control Processing Example

Figure 10:
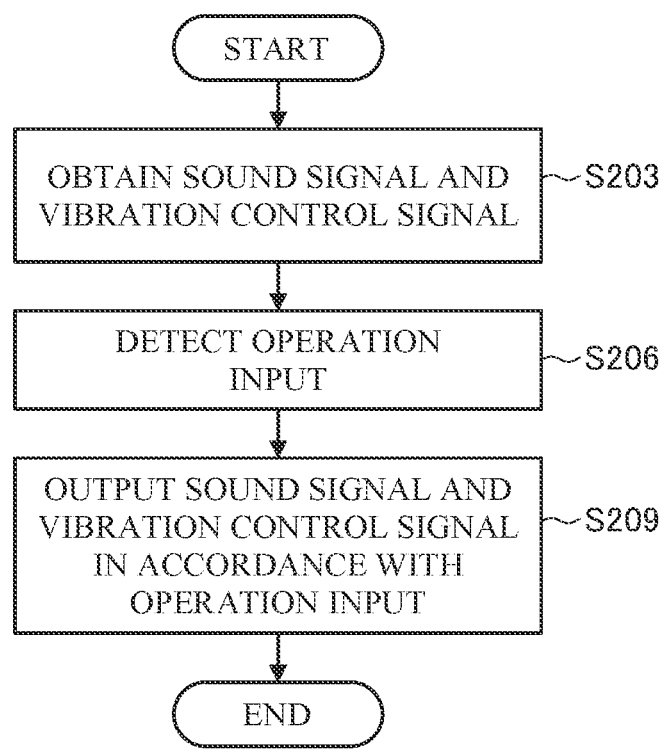
FIG. 10 is a flowchart illustrating an example of a processing flow of a vibration control signal output control according to the embodiment.

FIG. 10 is a flowchart illustrating an example of a processing flow of a vibration control signal output control according to the embodiment.

As illustrated in FIG. 10, the output control unit 221 obtains a sound signal and a vibration control signal (Step S203). The sound signal and the vibration control signal are obtained from the generation device 10, for example. The obtained data is stored in the storage unit 270. Such storing of the sound signal and the vibration control signal may be performed before a user uses the output device 20 (for example, at the time of shipment of the output device 20). Further, in a case where the generation device 10 is a server on the network, the output device 20 may download and store, in accordance with user's instruction, the sound signal and the vibration control signal from the generation device 10 through the network.

Next, the output control unit 221 detects an operation input by a user (step S206).

Next, the output control unit 221 performs, in accordance with the operation input, a control of outputting the sound signal and the vibration control signal (Step S209). For example, as described with reference to FIG. 1, the output control unit 221 may output the sound signal and the vibration control signal while a road image is traced (while a predetermined operation is performed) using the input device 30.

An example of the processing of vibration control signal output control has been described above. However, the operation processing of the embodiment is not limited thereto. For example, in response to a predetermined trigger such as detection of user's operation input or screen switch, the output device 20 may obtain the corresponding sound signal and vibration control signal from a server (server that stores sound signals and vibration control signals).

5. Modification

Figure 11:
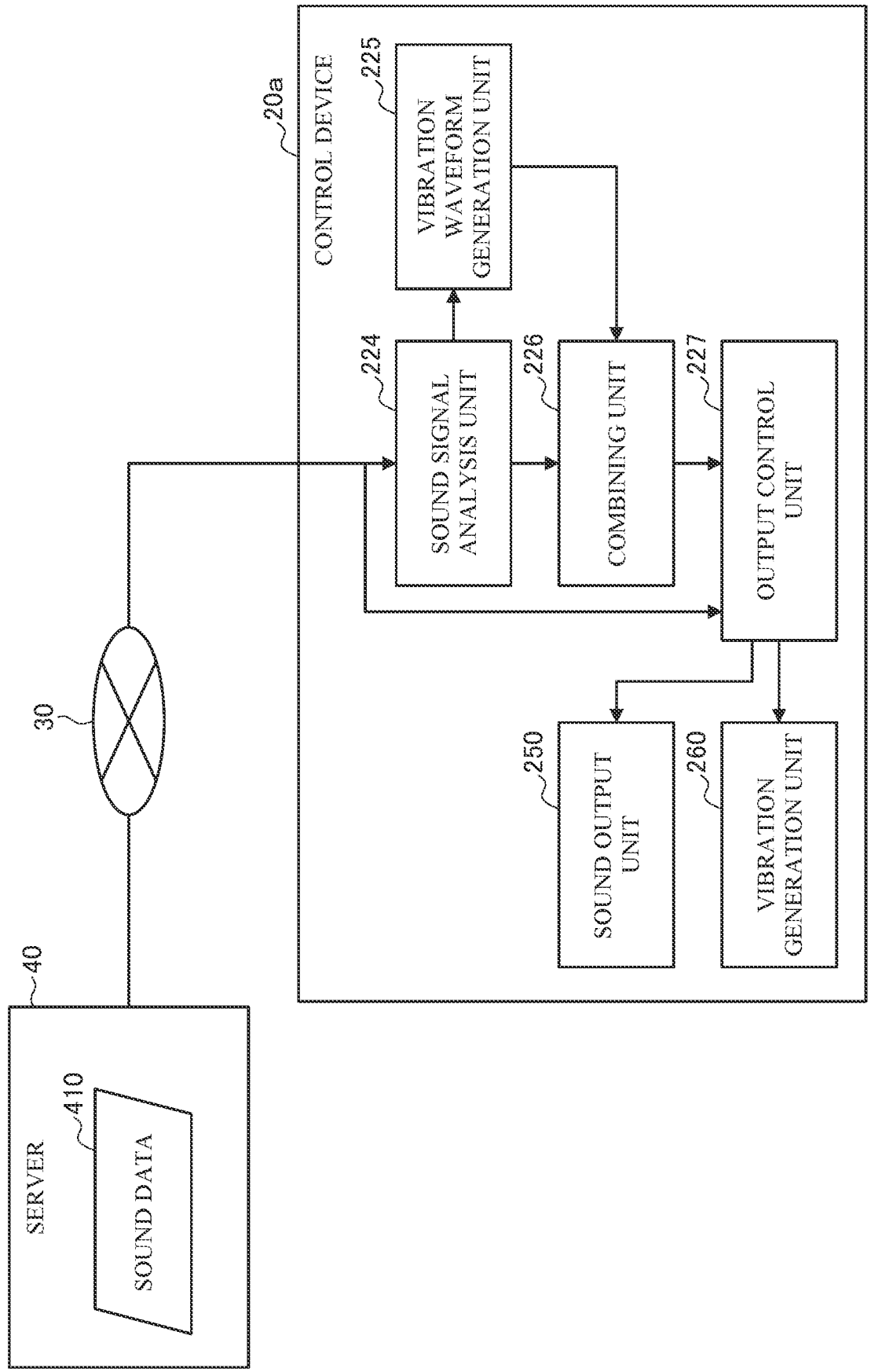
FIG. 11 is a diagram for explaining a control system according to a modification of the embodiment.

Further, as a modification of the embodiment, there is also proposed a control device in which the generation device 10 illustrated in FIG. 2 and the output device 20 illustrated in FIG. 3 are integrated. FIG. 11 is a diagram for explaining a control system according to a modification of the embodiment.

As illustrated in FIG. 11, a control device 20a includes a sound signal analysis unit 224, a vibration waveform generation unit 225, a combining unit 226, an output control unit 227, a sound output unit 250, and a vibration generation unit 260. The functions of each component are the same as those described with reference to FIG. 2 and FIG. 3. Although not illustrated, the control device 20a includes a communication unit that is communication connected to a server 40 through a network 30 and receives sound data 410 stored in the server 40.

The sound signal analysis unit 224 analyzes the sound data 410 (sound signal) received from the server 40, and outputs the analysis result (for example, a result of FFT application) to the vibration waveform generation unit 225. The vibration waveform generation unit 225 generates a vibration waveform for compensating vibration by the sound signal (sound data 410) on the basis of the analysis result. For example, as described above, the low frequency components extracted from the sound signal are amplified so as to generate a vibration waveform. The sound signal analysis unit 224 may extract low frequency components from the sound signal. Next, the combining unit 226 combines the sound signal (sound data 410) with the vibration waveform generated by the vibration waveform generation unit 225 so as to generate a vibration control signal.

Then, the output control unit 227 performs a control of generating vibration by outputting, from the sound signal output unit 250, the sound data 410 (sound signal) received from the server 40, and outputting the vibration control signal generated by the combining unit 226 on the basis of such sound data 410 to the vibration generation unit 260.

In this manner, the control device having a vibration control signal generation function and an output control function can appropriately generate and output, on the basis of arbitrary sound data (sound signal), a vibration control signal corresponding to the sound data.

6. Application Example

The following will describe an application example of the embodiment. The presentation of vibration (tactile information) for improving a feeling of presence according to the embodiment can be used in various devices, objects, scenes, and applications. For example, the following application examples can be considered.

For example, the present invention can be applied to vehicle-related devices. Examples include various in-vehicle devices such as various switches, a lever (a seat adjustment lever, and the like), a door knob, a glove box knob, and a remote controller that are provided in vehicles. When a user operates these, the output device of the embodiment presents, at various in-vehicle devices, SE sound (sound effect) and vibration (touch feeling) as feedback (FB) that the operation has been accepted by the system side, which improves operability and achieves fewer movable parts (reduces movable parts). The vibration as FB can also be adjusted to achieve an operation feeling that suits user's preference.

Note that examples of the in-vehicle device capable of vibration presentation include an engine start switch, a heater control switch, an electric parking brake (EPB) switch, a steering wheel switch, a console switch, a light switch, an instrument panel switch (for example, a trip switch), a head-up module, a lever combination switch, a paddle switch, a window regulator switch, a hazard switch, a dial switch, an audio switch, a tilt and telescopic steering (steering wheel position adjustment function), a touch pad, a seat switch, a mirror switch, a hazard switch, a fog lamp switch, a defogger switch, a rheostat, a neutral start switch, a parking brake switch, an engine oil pressure switch, a door lock switch, a brake lamp switch, a courtesy lamp switch, a back lamp switch, a back door switch, a shift lever, a key, a seat belt, a seat, a mirror, a buckle, a steering, a display, a sun visor, a floor, a door knob, a brake, an accelerator, a side brake, a window glass, an arm rest, a palm rest, a head rest, a dashboard, and the like. Further, examples of a remote controller include a smart key (portable device) that locks and unlocks vehicle doors.

Further, the present invention can be applied to electronic devices used daily. Examples include a personal computer (PC), a mouse, a key button, a tablet, a smartphone, an earphone, a headphone, a multifunction device, and the like. When a user operates these, the output device of the embodiment can present vibration (touch feeling) as feedback or the like that the operation has been accepted by the system side. Further, as feedback when a cursor in the screen has gone out of the operation area in a PC, a smartphone, a mouse, or the like, the output device of the embodiment may present vibration (touch feeling) of a feeling of being pulled into the operation area. The vibration may be presented from, for example, an operation unit (a place touched by a user, such as a mouse, a keyboard, or a touch panel display) of each electronic device.

Further, the present invention can be applied to furniture, houses, home electric appliances. Examples include a wall, a floor, a window, a desk, a chair, a sofa, an elbow rest, a cushion, a bath, a bed, a pillow, a door, a doorknob, a telephone, a knob for turning on a cooking stove, and the like. When a user operates these, the output device of the embodiment can present vibration (touch feeling) as feedback or the like that the operation has been accepted by the system side. Further, the output device of the embodiment can present various notifications such as earthquake early warnings by vibration of furniture or the like. Further, when the correct posture is obtained in a chair or a sofa, feedback may be provided by vibration. Further, when an entrance door is locked or unlocked, feedback may be provided by vibration.

Further, the present invention can be applied to various instruments such as stationery (pens such as colored pencils and crayons, notebooks, whiteboards, blackboards) and tools.

Further, the present invention can also be applied to objects used to move outdoors such as shoes, bicycles, and kickboards. For example, the output device of the embodiment can also use these to present navigation information by vibration, instead of visual or auditory information presentation. For example, the output device may notify, by vibration, of a place to turn, a vehicle coming from the left, right, or behind, and the like. Further, the presentation of navigation information by vibration may be performed by a device (a watch, a necklace, clothes, and the like) worn by a user. That is, running and navigation for who is walking can also be performed by vibration. Moreover, the presentation of navigation information by vibration by the output device is not limited thereto, and a device worn by a user (driver) may be vibrated in association with the drive navigation, for example.

Further, navigation information may be presented by vibration of braille blocks installed on roads. For example, a notification of the stairs about to end may be provided.

Further, the vibration of the embodiment may be presented in accordance with the reproduction of SE sound in a game, a movie, video distribution, or the like. Then, a controller, a mouse pad, a desk, a sofa, or the like may be vibrated.

Further, feedback that the operation has been received by the system side may be provided by vibration in remote controllers (remote controllers). For example, vibration may be presented by a TV remote controller, a remote controller for robot arm operation in medical sites and factories, a remote control controller for cars and construction vehicles in construction sites, a heavy machinery operation device, an operation lever, and the like. As an example, when a robot is remotely controlled, tactile information detected by the robot is transmitted to the controller. In this manner, the user can grasp the situation at the site more realistically as tactile information. Further, it is also possible to achieve the function as a vibration isolator at construction sites, medical sites, or the like by inputting reverse waveform data to vibration transmitted to a remote controller or an operation lever and vibrating the remote controller or the operation lever.

Further, the present invention can be also applied to simulators. The simulator can reproduce tactile information in a situation without an actual object. For example, the present invention can be used in simulators for various training such as car driving training, medical (surgery, and the like) training, and aircraft and ship operation training.

Further, the reproduction of vibration accompanied by a feeling of presence according to the present invention can be used as a sample for sales. For example, even without touching an actual product, the tactile feeling of the product (tactile feeling of clothes, fabric, materials, ceramics, and the like) can be reproduced by vibration to provide a simulated experience, or the tactile feeling of the product can be reproduced by vibration in association with mail order or by vibration as sale promotion at stores to provide a simulated experience (presentation of a feeling of pouring beer, for example).

Further, the present invention may be used for perception of a grip with a certain force. For example, the sense is paralyzed with continuous operation with a certain force, but with vibration given at a certain period, feedback of whether the current force is appropriate may be performed. For example, this is used in operating machines and rehabilitation. As a use in rehabilitation, it is assumed that vibration evoking the feeling of touching an object (more realistic vibration as if touching a real object) is given to a patient with nerve paralysis, for example.

Further, in scenes where it is difficult to obtain information visually or audibly, information may be presented by vibration as alternative perception. For example, the application to auxiliary devices used by persons who have difficulty obtaining information visually or audibly is possible. For example, a hearing aid attached to the ear, a terminal used for videophone, a bone conduction device, or the like may be used to convey, by vibration, the contents spoken by the other party. Further, when the sound output from a speaker is noisy, the use of vibration enables transmission of information in a range other than the audible range.

Further, it is also possible to provide a vibration presentation device that is attached to a hand, a foot, or the like and compensates the decline of a touch feeling. In this manner, the skin sense weakened in elderly persons can be compensated, for example. Further, it is also possible to provide dentures reproducing the chewing sense by vibration.

Further, with a speaker that presents both vibration and sound, it is also possible to improve a feeling of presence and immersion feeling during sound reproduction. For example, when videos or music are reproduced on a smartphone, the corresponding vibration is also output. The vibration may be presented by the smartphone itself, a headphone attached to the head, a wearable device such as a necklace, a wall, a floor, furniture, a home electric appliance, or the like. Further, a control of outputting a TV sound source as vibration may be performed. The vibration in this case may be performed by, for example, a TV remote controller, furniture such as a sofa, a surrounding home electric appliance, a wall, a floor, or the like.

Further, in a shared space such as an airplane, it is also possible, with vibration as presentation replacing sound, to improve a feeling of presence and immersion feeling.

Further, the present invention can also be applied to children's toys to improve a feeling of presence and immersion feeling. For example, in anime goods (a lightsaber, a magic wand, or the like), a stuffed animal, a picture book, a gun, a vehicle toy, a miniature car, a building block, a play set, a doll, a block, a ball, a racket, a yo-yo, a cup and ball, a jump rope, a roller skate, a shoes, or the like, vibration for reproducing a predetermined phenomenon can be presented to provide a feeling of presence.

Further, vibration presenting a writing feeling of writing on paper may be performed with a stylus pen.

Further, it is also possible to vibrate a natural object such as wood or bamboo.

Further, in electronic musical instruments, it is also possible to realistically reproduce a predetermined touch feeling by vibration. For example, in an electronic piano, the pressing feeling and tactile feeling of the keyboard can be changed by vibration (reproduction of an acoustic piano is possible). Further, with vibration of sticks of an electronic drum, it is also possible to improve the operation feeling or change the operation feeling in accordance with player's preference.

Further, it is also possible to give a pleasant hitting feeling by vibration in sports equipment. Further, it is also possible to give a realistic hitting feeling by vibration in sports equipment used for simulation games. To be specific, for example, a baseball glove or bat can be vibrated to give a pleasant catching feeling or hitting feeling, or a golf bat can be vibrated in golf (simulation golf) to give a pleasant hitting feeling. This also allows children and the elderly persons to be entertained.

Further, in various game machines (crane games, board games, arcade games, racing games, and the like) in penny arcades, game machines and attractions in amusement parks, theme parks, and the like, the presentation of vibration for improving a feeling of presence and immersion feeling is possible. Further, it is also possible to vibrate pieces for home board games so as to improve the operation feeling. The operation feeling by vibration can be appropriately changed in accordance with one's preference.

7. Supplement

Heretofore, preferred embodiments of the present invention have been described in detail with reference to the appended drawings, but the present invention is not limited thereto. It is obvious that a person skilled in the art can arrive at various alterations and modifications within the scope of the technical ideas defined in the claims, and it should be naturally understood that such alterations and modifications are also encompassed by the technical scope of the present invention.

For example, the generation device 10 may be a server on the network, and generate, in response to a request from the output device 20, a vibration control signal corresponding to a specified sound signal and send it back to the output device 20. Further, the generation device 10 may preliminarily store a sound signal, generate, in response to a request from the output device 20, a vibration control signal corresponding to a predetermined sound signal, and transmit the sound signal and the generated signal control signal to the generation device 10.

Further, the above-described embodiments, application examples, and the contents described in the supplement may be combined with each other. Further, at least a part of the generation device 10 may be provided in a different device (for example, a server or the output device 20).

The effects described in the present specification are merely explanatory or representatives and are not restrictive. That is, the technologies of the present disclosure can exert other effects that are clear for a person skilled in the art on the basis of the description in the present specification, together with or instead of the above-described effects.

Further, it is also possible to form one or more programs controlling a hardware such as a CPU, a ROM, and a RAM embedded in a computer to achieve the functions equivalent to those of the components of the generation device 10 or the output device 20, and it is also possible to provide a computer readable recording medium recording the one or more programs.

REFERENCE SIGNS LIST 10 generation device
110 communication unit
120 control unit
121 sound signal analysis unit
122 vibration waveform generation unit
123 combining unit
130 storage unit
20 output device
210 communication unit
220 control unit
221 output control unit
230 operation input unit
240 display unit
250 sound output unit
260 vibration generation unit
270 storage unit
20a control device
224 sound signal analysis unit
225 vibration waveform generation unit
226 combining unit
227 output control unit

The invention claimed is:

1. A control device, comprising:
a storage medium that stores a sound signal, and
a processor that obtains the sound signal from the storage medium, and performs processing of combining a vibration waveform for compensating vibration by the sound signal with the sound signal so as to generate a vibration control signal for controlling generation of vibration,
wherein the processor generates the vibration waveform for adding a sine wave to the sound signal at a position where a sound pressure of the sound signal is equal to or higher than a prescribed value on a basis of an analysis result of the sound signal.

2. The control device according to claim 1, wherein
the storage medium stores a plurality of sound signals, and
the processor obtains the sound signal from among the plurality of sound signals.

3. The control device according to claim 2, wherein
the processor obtains the sound signal from among the plurality of sound signals in response to a predetermined trigger, with the sound signal corresponding to the predetermined trigger.

4. The control device according to claim 3, wherein
wherein the predetermined trigger includes an input operation of a user.

5. A control device, comprising:
a storage medium that stores a sound signal, and
a processor that performs:
obtaining the sound signal from the storage medium
processing of combining a vibration waveform for compensating vibration by the sound signal with the sound signal so as to generate a vibration control signal for controlling generation of vibration; and
processing of outputting the vibration control signal to a vibration actuator,
wherein the processor generates the vibration waveform for adding a sine wave to the sound signal at a position where a sound pressure of the sound signal is equal to or higher than a prescribed value on a basis of an analysis result of the sound signal.

6. The control device according to claim 5, wherein the processor performs a control of outputting the sound signal from a sound output and outputting the vibration control signal generated on a basis of the sound signal to the vibration actuator.

7. The control device according to claim 5, wherein
the storage medium stores a plurality of sound signals, and
the processor obtains the sound signal from among the plurality of sound signals.

8. The control device according to claim 7, wherein
the processor obtains the sound signal from among the plurality of sound signals in response to a predetermined trigger, with the sound signal corresponding to the predetermined trigger.

9. The control device according to claim 8, wherein
wherein the predetermined trigger includes an input operation of a user.

10. A control device, comprising:
a storage medium that stores a sound signal, and
a processor that obtains the sound signal from the storage medium, and performs processing of outputting a vibration control signal for controlling generation of vibration to a vibration actuator, the vibration control signal being generated by combining a vibration waveform for compensating vibration by the sound signal with the sound signal,
wherein the vibration waveform adds a sine wave to the sound signal at a position where a sound pressure of the sound signal is equal to or higher than a prescribed value.

11. The control device according to claim 10, wherein
the storage medium stores a plurality of sound signals, and
the processor obtains the sound signal from among the plurality of sound signals.

12. The control device according to claim 11, wherein
the processor obtains the sound signal from among the plurality of sound signals in response to a predetermined trigger, with the sound signal corresponding to the predetermined trigger.

13. The control device according to claim 12, wherein
wherein the predetermined trigger includes an input operation of a user.

* * * * *